Dec. 30, 1930.   T. BROWN   1,787,137
PLOW
Filed Nov. 12, 1928
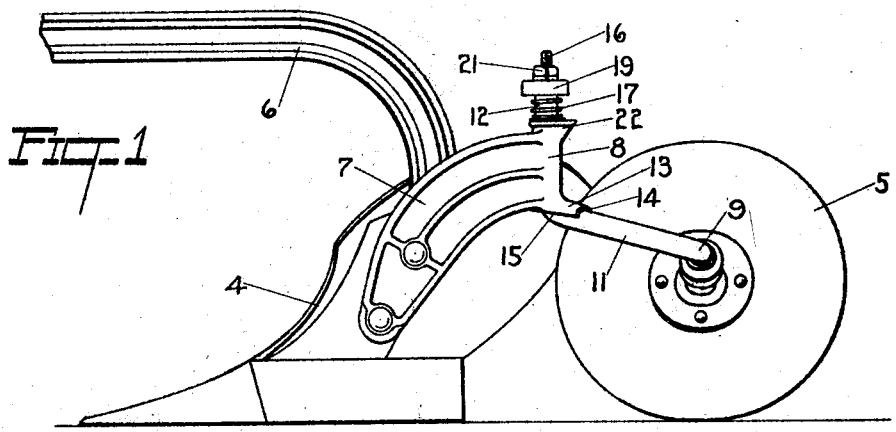
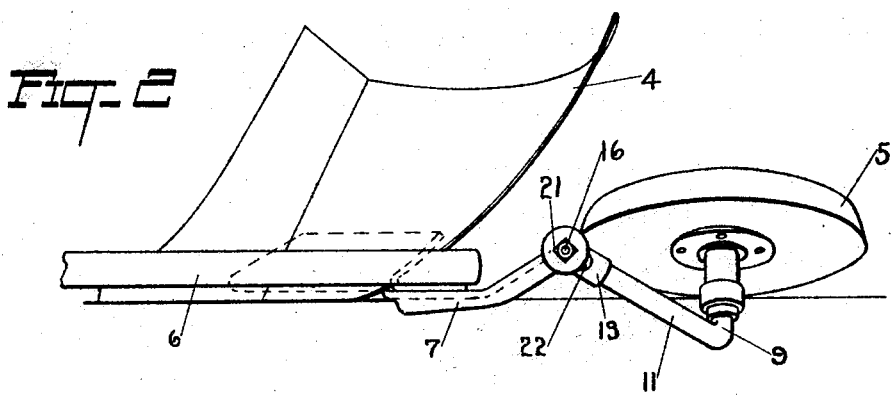
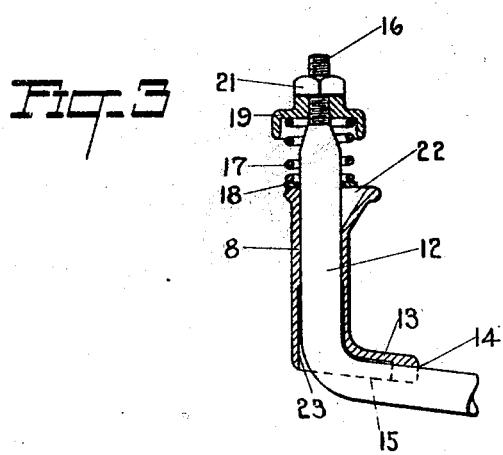

Patented Dec. 30, 1930

1,787,137

UNITED STATES PATENT OFFICE

THEOPHILUS BROWN, OF MOLINE, ILLINOIS, ASSIGNOR TO DEERE & COMPANY, OF MOLINE, ILLINOIS, A CORPORATION OF ILLINOIS

PLOW

Application filed November 12, 1928. Serial No. 318,653.

The present invention relates generally to plows, and has particular reference to an improved manner of mounting the rear furrow wheel on wheeled plows.

The general object of the invention is to provide a mounting for the rear furrow wheel characterized by restraining means which will firmly hold the wheel in straight tracking alinement with the rear plow bottom during the plowing operation, preventing any castering movement of the wheel at this time, and which will only permit the wheel to swing or caster when the implement is being turned at the end of the field, at which time the heavy turning force exerted laterally against the furrow wheel serves to automatically release the same from the restraining means so that the wheel can thereafter caster freely for permitting easy turning of the implement. When the implement is brought back into plowing alinement the furrow wheel again returns automatically to the holding influence of said restraining means.

Other objects concerned with the detail structure of the wheel mounting will be apparent from the following description of a preferred embodiment thereof.

In the accompanying drawing illustrating such embodiment:

Fig. 1 is a side elevational view of the rear portion of a wheeled plow, illustrating my improved mounting for the rear furrow wheel.

Fig. 2 is a plan view of the same; and

Fig. 3 is a vertical sectional view through the vertical bearing boss relatively to which the furrow wheel swings.

The rear plow bottom is indicated at 4 and the rear furrow wheel at 5. Both are mounted on a supporting member or portion of the implement represented by the curved plow beam 6. Projecting rearwardly from the plow 4 is a bracket 7 constituting part of the furrow wheel mounting. Such bracket may be secured directly to the plow beam 6, or to the land-side of the plow 4. Formed integral with the rear portion of the bracket 7 is a substantially vertical bearing boss 8 relatively to which the furrow wheel has castering movement. The wheel is journaled on the spindle end of an axle 9, which spindle end is inclined downwardly toward the furrowward side of the implement to cant the wheel for running in the furrow opened by the plow bottom 4. The axle 9 is provided with an arm portion 11 which extends forwardly and slightly upwardly to the bearing boss 8. Here the axle is formed with a substantially vertical pivot portion 12 which extends upwardly through the bearing boss 8, such pivot portion being free to swivel in the bearing boss as well as to slide vertically therein.

Referring to Fig. 2, it will be seen that the rear portion of the bracket 7 and also the arm portion 11 of the axle extend inwardly toward the furrowward side of the implement to dispose the vertical castering axis of the furrow wheel in the proper plane to have the wheel normally tend to track directly in the furrow opened by the plow bottom 4.

The restraining or detent means for normally holding the wheel in set position during all plowing operations comprises a lug or arm 13 which projects diagonally rearwardly from the lower end of the bearing boss 8 in the normal plane of the axle arm 11. The upper surface of the axle arm is rounded, the same being constructed of round bar stock. The lug 13 is adapted to bear on this rounded upper surface when the furrow wheel is in its normal plowing position, and to yieldingly hold said wheel in this position. The under side of the lug is formed concave or with a longitudinal groove, as indicated at 14, which bears upon and partially embraces the upper side of the axle arm 11. Preferably, the lug 13 is extended downwardly at the same inclination as the axle arm 11 to engage over a sufficient length of the latter to firmly hold the wheel. The weight of the rear end of the implement and the suction of the plow bottom 4 transmit a downward force to the bearing boss 8 and restraining lug 13, causing the latter to be pressed downwardly against the upper side of the axle arm 11 for firmly holding the axle against castering movement. When the implement reaches the end of the field and begins to turn, a heavy side thrust is imposed on the rear furrow wheel 5, which causes the axle arm 11 to cam itself out from under the concave under side of the lug 13, the bearing boss 8 sliding upwardly along the pivot portion 12 at such time, whereupon the axle and furrow wheel are free to swivel so that the implement can be easily turned.

At this time the upper surface of the axle arm 11 bears against the inclined lower edge 15 of the lug 13, in which relation it can easily swing. When the plow is brought back into plowing alinement and moves forwardly, the wheel 5 swings rearwardly in its natural castering tendency and when properly alined with the rear plow bottom 4 the grooved underside 14 of the lug drops down over the upper surface of the axle arm 11, thereby locking the furrow wheel in fixed alinement until the implement is again turned at the opposite end of the field.

Referring to Fig. 3, the upper extremity of the axle pivot portion 12 extends above the bearing boss 8 and has a reduced threaded end 16. A compression spring 17 surrounds this projecting upper portion, and bears at its lower end on a collar 18 which seats on the upper end of the bearing boss. The upper end of said spring extends into the recessed under side of a collar or cap 19 which engages over the threaded end 16 of the pivot standard. A nut 21 screws down over this threaded end and holds the collar 19 with the spring 17 adjusted to a predetermined pressure. It will be noted that the spring aids in holding the restraining lug 13 pressed down in yielding locking engagement over the axle arm 11, but the yieldability of the spring permits the arm to force itself downwardly out of the groove 14 when the implement is turning. The pressure of the spring is preferably adjusted so that when the furrow wheel 5 is lifted entirely off the ground the pressure of said spring will sustain the weight of the furrow wheel and hold the axle arm 11 pressed upwardly in the concave under side of the restraining lug 13.

The upper rear side of the bearing boss 8 is formed with a tapered or funnel-shaped enlargement 22 into which lubricant may be inserted and retained, for seepage down to the bearing surfaces of the boss and of the standard.

The lower end of the bearing boss is preferably formed with a slightly enlarged counterbore 23 to permit dropping the particles of dirt and other foreign matter from the bearing surfaces of the boss and pivot standard.

Having thus described my invention what I claim as new and desire to secure by Letters Patent is:

1. In a plowing implement, the combination of a supporting member, a plow carried thereby, a furrow wheel in rear of said plow, a bracket carried by said supporting member having a substantially vertical bearing boss, a swinging axle for said furrow wheel comprising a forwardly and upwardly extending arm portion and a substantially vertical pivot standard at its front end, said pivot standard being mounted for rotative and vertical sliding movement in said bearing boss and having its upper end projecting above the same, the forwardly extending arm portion of said axle having a rounded upper surface, a lug projecting from the lower end of said bracket and having a concave under surface extending along and embracing the rounded upper surface of said arm portion, a spring surrounding the upper end of said pivot standard and bearing on said boss, a collar on said pivot standard engaging with the upper end of said spring, and a nut screwing down over said pivot standard for adjusting the pressure of said spring through said collar.

2. In a plowing implement, the combination of a supporting member, a plow carried thereby, a furrow wheel in rear of said plow, a bracket carried by said supporting member having an upwardly extending bearing boss, a swinging axle for said furrow wheel comprising a forwardly extending arm portion and an upwardly extending pivot portion adjacent to its front end, said pivot portion being mounted for rotative and endwise sliding movement in said bearing boss and having its upper end projecting above the same, a lug projecting from said bracket and having a grooved under surface extending along and embracing the upper side of said axle arm, a spring surrounding the upper end of said pivot portion and bearing on said boss, and adjustable means engaging the upper end of said spring and mounted on said pivot portion.

3. In a plowing implement, the combination of a supporting member, a plow carried thereby, a furrow wheel in rear of said plow, a bracket carried by said supporting member having a substantially vertical bearing boss, a swinging axle for said furrow wheel comprising an inclined spindle portion on which the wheel is journaled, a forwardly and upwardly extending arm portion and a substantially vertical pivot standard at the front end of said arm portion, said pivot standard extending upwardly through said bearing boss for rotative and vertical sliding movement therein, the arm portion of said axle having a rounded upper surface adjacent to said boss, a lug projecting from the lower end of said boss and having a concave under surface extending along and partially embracing the rounded upper surface on said axle arm, said pivot standard extending above said bearing boss and having a threaded upper end, a compression spring mounted on said pivot standard and bearing against the supper end of said boss, a collar mounted on said pivot standard, a nut screwing over the threaded end thereof for shifting said collar to adjust the pressure of said spring, and a funnel-shaped enlargement at the upper end of said boss for admitting lubricant to the bearing surfaces of said boss and of said pivot standard.

4. In a plowing implement, the combination of a supporting member, a plow carried thereby, a furrow wheel in rear of said plow, a bracket carried by said supporting member having an upwardly extending bearing boss, a swinging axle for said furrow wheel having an upwardly extending pivot portion mounted for rotative and endwise sliding movement in said bearing boss, a lug projecting from said bracket and having a recessed under surface engaging directly with said axle for restraining swinging movement thereof to hold said furrow wheel in plowing alinement, said axle releasing itself under lateral pressure from said lug for permitting castering movement of said wheel when the implement is being turned, and spring means normally tending to hold said axle in restraining engagement with said lug.

5. In a plowing implement, the combination of a supporting member, a plow carried thereby, a furrow wheel in rear of said plow, a bracket carried by said supporting member having an upwardly extending bearing boss, a swinging axle for said furrow wheel comprising a pivot portion mounted for rotative and endwise sliding movement in said boss, and a rearwardly projecting lug on said bracket having a recessed under surface adapted to engage directly with said axle for holding the latter against swinging movement when the furrow wheel is in plowing alinement, said axle releasing itself under lateral pressure from the restraining engagement of said lug when the implement is being turned.

6. In a plowing implement, the combination of a supporting member, a plow carried thereby, a furrow wheel in rear of said plow, a bracket carried by said supporting member, a swinging axle for said furrow wheel carried by said bracket for rotative and vertical movements, said axle comprising an arm portion normally extending rearwardly from below said bracket, cooperating surfaces on said bracket and on said rearwardly extending arm portion of the axle for normally restraining swinging movement of said axle when said furrow wheel is in plowing alinement, said surfaces automatically releasing said axle when said furrow wheel is forced laterally in the turning of the implement, and spring means normally tending to hold said surfaces in cooperative engagement.

7. In a plowing implement, the combination of a supporting member, a plow carried thereby, a furrow wheel in rear of said plow, a swinging member on which said furrow wheel is mounted, said swinging member being supported for swinging movement on said supporting member, and releasable detent means comprising an extending arm having a longitudinal groove therein for holding said swinging member against swinging movement when said furrow wheel is in plowing alinement, said detent means being released by the lateral pressure of said furrow wheel when the implement is being turned.

8. In a plowing implement, the combination of a supporting member, a plow carried thereby, a furrow wheel in rear of said plow, a bracket carried by said supporting member having an upwardly extending bearing boss, the lower portion of said bracket projecting rearwardly beyond said bearing boss and having a recessed under-side, a swinging axle for said furrow wheel comprising a pivot portion mounted for rotative and endwise sliding movement in said boss, the aforesaid bracket being adapted to engage said axle by means of its rearwardly projecting recessed portion for holding the axle against swinging movement when the furrow wheel is in plowing alignment, said axle disengaging itself under lateral pressure from the projecting recessed portion of said bracket when the implement is being turned.

9. In a plowing implement, the combination of a supporting member, a plow carried thereby, a furrow wheel in rear of said plow, a bracket carried by said supporting member having an upwardly extending bearing boss, a swinging axle for said furrow wheel carried by said bearing boss for rotative movement, and restraining means comprising a rearwardly extending concave portion of said bearing boss, said axle directly engaging said concave extending portion of said bearing boss and normally restraining said furrow wheel against swinging laterally when it is in plowing alignment, but permitting said wheel to swing laterally when the implement is being turned.

10. The combination with a plowing implement having a supporting member, a plow carried thereby, and a furrow wheel in rear of said plow, of a bracket carried by said supporting member having a substantially vertical bearing boss, a swinging axle for said furrow wheel permitting castering movement of the latter and comprising a pivot standard extending substantially vertically from the front end of said axle and having rotative bearing support in said bearing boss, adjustable resilient holding means adapted to retain such pivot standard in said bearing boss, comprising a spring encircling said standard disposed between an adjustable collar on said standard and a second collar thereon abutting said bearing boss, and a funnel-shaped enlargement protruding radially outwardly at the upper end of said bearing boss and extending beyond the edge of said second collar for the admission of lubricant to the bearing surfaces of said boss and of said pivot standard.

In witness whereof, I hereunto subscribe my name this 8th day of Nov., 1928.

THEOPHILUS BROWN.